United States Patent

Oureshi

[11] Patent Number: 5,356,734
[45] Date of Patent: Oct. 18, 1994

[54] BATTERY CLOSURE MEANS
[75] Inventor: Nawaz M. Oureshi, La Mirada, Calif.
[73] Assignee: Trojan Battery Company, Sante Fe Springs, Calif.
[21] Appl. No.: 184,276
[22] Filed: Apr. 21, 1988

Related U.S. Application Data
[63] Continuation-in-part of Ser. No. 120,527, Nov. 13, 1987, abandoned.
[51] Int. Cl.[5] ............................................. H01M 2/12
[52] U.S. Cl. ........................................ 429/88; 429/89; 429/163
[58] Field of Search ......................... 429/87–89, 429/163, 175

[56] References Cited
U.S. PATENT DOCUMENTS

| | | | |
|---|---|---|---|
| 1,283,670 | 11/1918 | Christiansen | 429/89 |
| 3,083,255 | 3/1963 | Slautterback | 429/89 |
| 3,369,940 | 2/1968 | Slautterback | 429/88 |
| 3,388,007 | 6/1968 | Fiandt | 429/89 |
| 3,394,035 | 7/1968 | Cox et al. | 429/87 X |
| 3,508,972 | 4/1970 | Goldingay | 429/88 |
| 4,214,045 | 7/1980 | Jutte et al. | 429/88 |
| 4,219,612 | 8/1980 | Tatlock | 429/89 X |
| 4,338,383 | 7/1982 | Jutte et al. | 429/87 |
| 4,477,542 | 10/1984 | Braswell | 429/87 |

Primary Examiner—Stephen Kalafut
Attorney, Agent, or Firm—Christie, Parker & Hale

[57] ABSTRACT

Battery closure means which is adapted to mate with a cell access opening constructed with at least a partial helical surface or segment to normally receive a rotatable bayonet-style plug, such closure means having at least one stopper formed with depending arms each of which comprises outward extensions having tapered surfaces to engage such helically-shaped segments to enable such stopper to seal the cell access opening upon rectilinear insertion of the battery closure means.

6 Claims, 3 Drawing Sheets

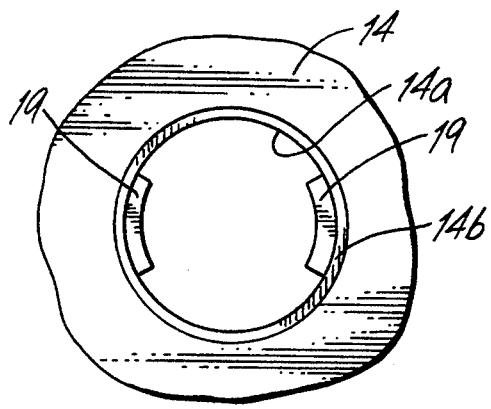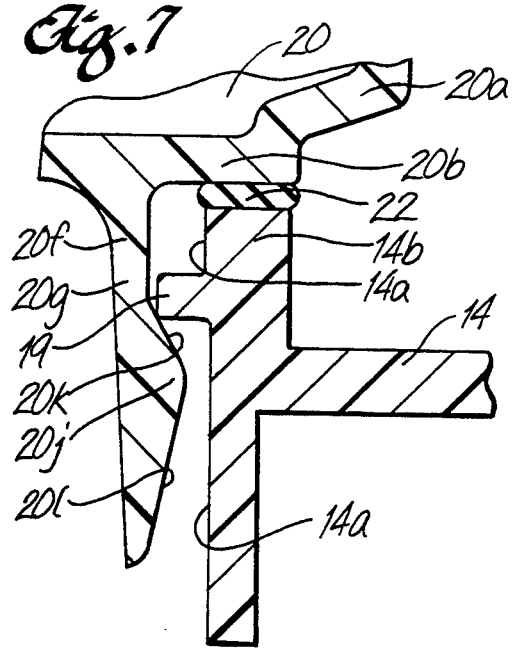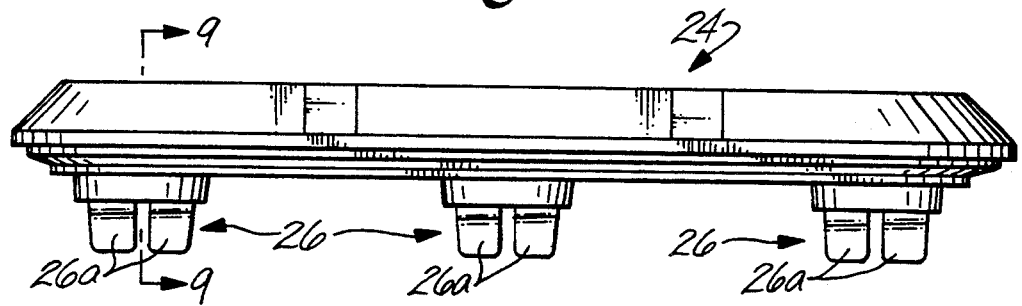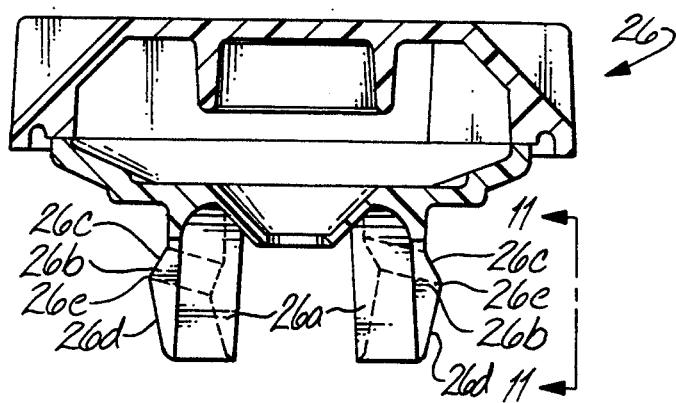

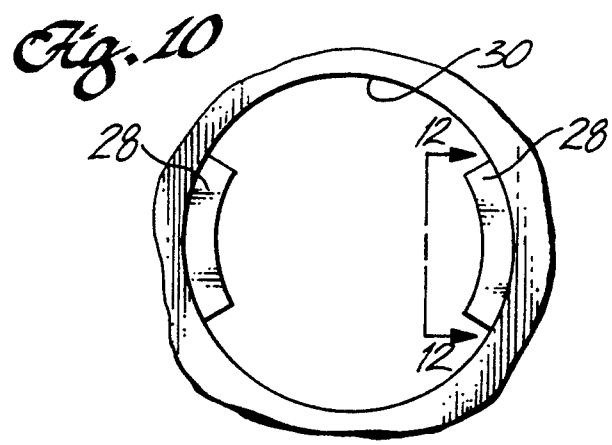
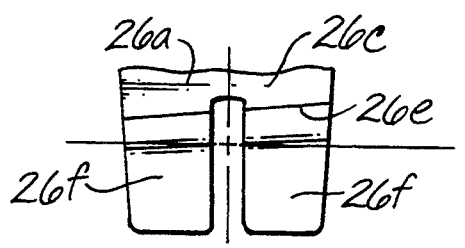
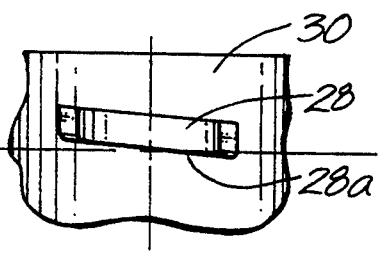
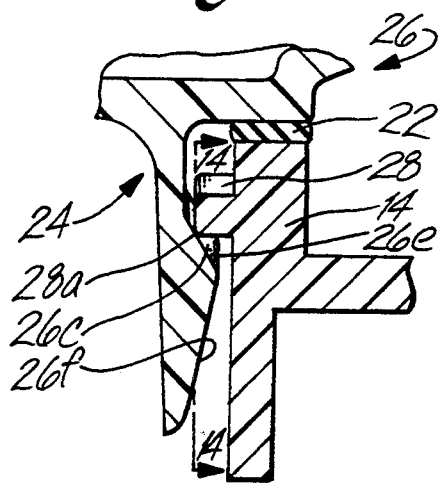
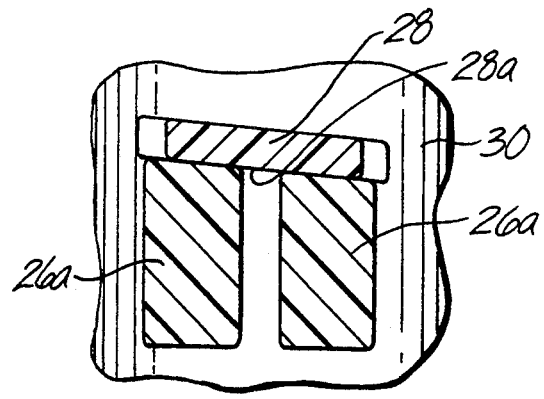

BATTERY CLOSURE MEANS

This is a continuation-in-part of co-pending application Ser. No. 07/120,527 filed on Nov. 13, 1987, now abandoned.

The present invention relates generally to battery closure means, but more particularly to battery closure structures for converting existing batteries, having bayonet-type cover openings, from requiring the use of rotatable plugs to seal the cell openings to the use of rectilinearly insertable stoppers for accomplishing the same results without changing the construction of the various cell access openings for adding water or for checking the electrolyte specific gravity, and for allowing the emissions to escape from the battery. This invention significantly reduces the time and labor costs involved in maintenance of large numbers of batteries for various applications such as the power source for large numbers of golf carts.

BACKGROUND OF THE INVENTION

In constructing electric storage batteries, has heretofore been most common to provide closure plugs in the cell access openings which require a twisting or rotational motion in order to properly seal the particular cell. The cover of the battery has heretofore been provided with cell access openings wherein there are helical segments or ears projecting radially inwardly into the cell access opening, to enable a sealing plug formed with a helix or a portion of a fastening thread to mate with such helical segments to effect the desired seal.

Within more recent years, however, rectilinearly insertable plugs have been provided, but these have required different cell access opening construction such that the rectilinearly insertable plug and the opening therefor are formed with complemental surfaces and projections. This has left a considerable quantity of electrical storage batteries which were originally constructed for the twist or rotatable plug without the ability to take a rectilinearly insertable stopper or plug. The bottom line of such dilemma is that the batteries heretofore constructed for the rotatable plug have not been useable with a closure means having ganged stoppers whereby all of the stoppers can be inserted into the various cell access openings or removed therefrom, as desired, in a single, non-rotating, normally vertical motion. U.S. Pat. No. 4,477,542 to Richard R. Braswell for QUICK RELEASE STORAGE BATTERY CLOSURE ASSEMBLY, discloses means for ganging together a plurality of rotatable or twist plugs.

OBJECTS OF THE INVENTION

In view of the foregoing, it is an object of the present invention to provide battery closure means for use on an electric storage battery which has originally been constructed for receiving a twist or rotatable sealing plug, whereby the new closure means provides sealing stoppers which can be rectilinearly insertable into the old or prior cell access opening configuration.

Another object of the present invention is to provide battery closure means as characterized above which is so constructed that the prior battery cover construction need not be changed, but nonetheless, the various stoppers can be ganged together so that they can be simultaneously inserted or removed from the respective battery cells.

Another object of the present invention is to provide battery closure means as characterized above which is so constructed that it includes a stopper for each battery cell, which stopper is constructed to cooperate with helically-shaped segments or ears within the battery cover cell access openings to afford sealing cooperation between the various stoppers and cell access openings.

An even further object of the present invention is to provide battery closure means as characterized above wherein the stoppers for insertion in the cell access openings are formed with depending arms having outward extensions which engage the helical segments or ears such as to cause the sealing stoppers to be drawn into the cell access openings with predetermined bias.

An even further object of the present invention is to provide battery closure means as characterized above wherein the depending arms of the individual stoppers are formed of plastic and have tapered surfaces which matingly engage the corresponding helical segments or ears.

A still further object of the present invention is to provide battery closure means as characterized above which is simple and inexpensive to manufacture and which is rugged in and dependable in operation.

An even still further object of the present invention is to provide battery closure means which makes it easier, faster and more convenient to remove and install such means than the existing plugs for the bayonet opening type of batteries.

BRIEF DESCRIPTION OF THE DRAWINGS

The novel features which I consider characteristic of my invention are set forth with particularity in the appended claims. The invention itself, however, both as to its organization and mode of operation, together with additional objects and advantages thereof, will best be understood from the following description of specific embodiments when read in combination with the accompanying drawings, in which:

FIG. 6 is a fragmentary view of a battery cover;

FIG. 7 is a fragmentary sectional view of a stopper and battery cover opening according to the present invention;

FIG. 8 is a side elevational view of a second embodiment of battery closure means in accordance with the present invention;

FIG. 9 is a transverse sectional view of the second embodiment, taken substantially along line 9—9 of FIG. 8 of the drawings;

FIG. 10 is a fragmentary top plan view of a battery cell access opening in a battery cover;

FIG. 11 is a fragmentary elevational view taken substantially along line 11—11 of FIG. 9;

FIG. 12 is a fragmentary elevational view taken substantially along line 12—12 of FIG. 10;

FIG. 13 is a fragmentary sectional view showing the sealing engagement between a plug of the second embodiment and the access opening in the battery cover; and FIG. 14 is a fragmentary sectional view taken substantially along line 14—14 of FIG. 13.

Like reference characters indicate corresponding parts throughout the several views of the drawings.

DESCRIPTION OF THE PREFERRED EMBODIMENT

Figure 1:
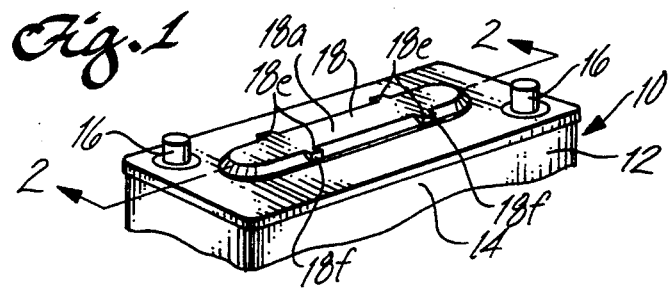
FIG. 1 is a fragmentary perspective view of an electric storage battery having the subject closure means.

Referring to FIG. 1 of the drawings, there is shown therein an electric storage battery 10 having a battery case 12 and a cover 14 therefor. The cover 14 is formed with appropriate through openings through which terminal posts 16 extend for connecting the battery in an appropriate electrical circuit.

Mounted on the cover 14 of battery 10 is closure means 18 according to the present invention.

Shown most particularly in FIGS. 6 and 7 of the drawings, the battery cover 14 is formed with one or more cell access openings 14a through which access is afforded to the cells of the battery. Such access is opening 14a is usually circular in shape, as shown in FIG. 6, and is adapted to receive a plug or the like for properly sealing the respective cell.

As shown in FIG. 6, the access opening 14a comprises two or more segments or ears 19 which are usually formed integrally with the cover 14 and extend inwardly toward the center of the access opening. Such ears 19 are usually formed with a helix or helical surface to accommodate a complementally-formed surface on a fastening plug (not shown). Usually, such plug is twisted or rotated through at least ninety angular degrees so as to cause the helical surfaces of the plug to engage the helical ears 19 to thereby make a firm sealing engagement between the plug and the peripheral marginal edge 14b of the opening 14a. Such a twist-type plug is not shown in the drawings as it represents prior art which is to be eliminated or improved upon by the subject battery closure means 18.

Figure 2:
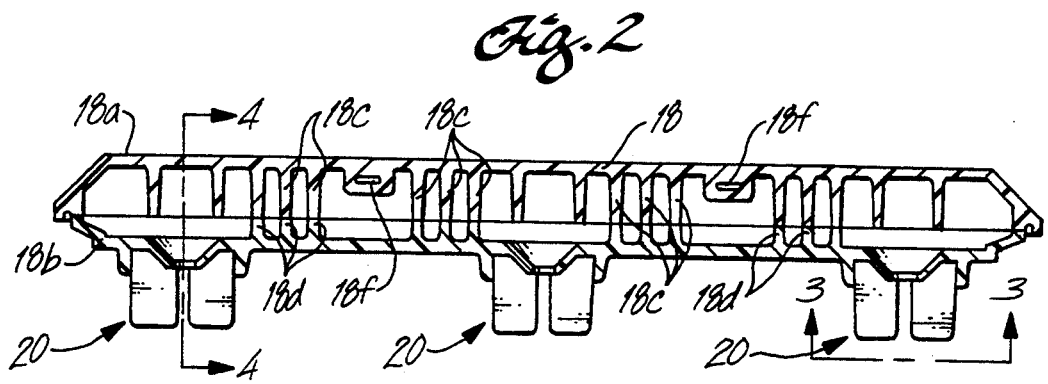
FIG. 2 is a longitudinal sectional view of the closure means, taken substantially along line 2—2 of FIG. 1.

The closure means 18 shown in FIG. 1 of the drawings is shown in longitudinal cross-sectional detail in FIG. 2, and comprises upper and lower molded sections 18a and 18b formed of tough, chemical-resistant plastic material. The upper section 18a is formed with a plurality of ribs 18c which afford the formation of passages and chambers when mated with the ribs 18d in the lower section 18b. These passages remove the liquid portion of the battery emissions and drain it back into the cell through the funnel 20c.

The upper section 18a of closure means 18 is further formed with bosses 18e on opposite sides of section 18a, and a through opening is provided in each of such bosses, as shown at 18f through which the usual gases from the battery cell can escape to the atmosphere. Each of the bosses 18e has a porous disc which prevents a flame from entering the battery in case the battery gases ignite outside the openings 18f. This prevents an explosion. The orientation of the openings 18f is such that they are farthest away from the battery posts 16 to minimize the possibility of ignition of battery emissions exhausted through openings 18f.

Typically, the upper and lower sections 18a and 18b of closure means 18 are bonded together along their mating edges to thereby provide the strong, corrosion-resistant closure means.

Figure 3:
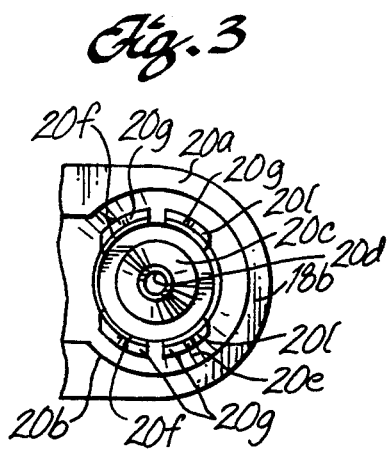
FIG. 3 is a fragmentary bottom view of a portion of the battery closure means of FIG. 2.
Figure 4:
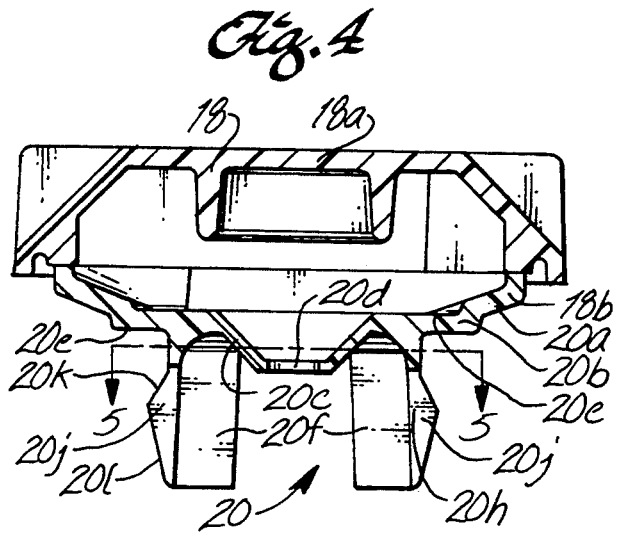
FIG. 4 is a sectional view taken substantially along line 4—4 of FIG. 2.
Figure 5:
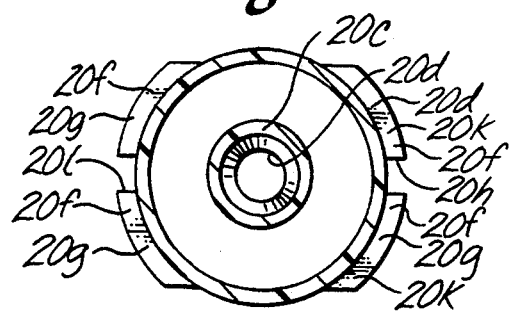
FIG. 5 is a sectional view taken substantially along line 5—5 of FIG. 4.

The lower section 18b is formed with one or more stoppers 20, one for each of the battery cells to be sealed. FIGS. 3, 4 and 5, each such stopper is formed with an annular frusto-conically-shaped portion 20a which is formed integrally with section 18b and terminates in a generally coplanar section 20b having an annular frusto-conical funnel section 20c. The latter is formed with a through opening 20d through which, as will hereinafter become more apparent, the gases from the particular battery cell are permitted to escape into the interior of the closure device 18 and thence to the atmosphere through the aforementioned openings 18f. Any liquid from the battery cells is retained in the chambers formed in cover 18 and is drained back into the cells through the openings 20d.

The generally coplanar portion 20b of the stopper 20 is formed with an annular surface 20e (FIGS. 3 and 4) which is adapted to bear against a resilient washer 22 to compress the same against the edge 14b of opening 14a in cover 14 as shown in FIG. 7 of the drawings.

The stopper 20 is formed with several depending arms 20f which are formed integrally with the generally coplanar section 20b of the stopper, as shown most particularly in FIGS. 4 and 5 of the drawings. Such arms 20f, as generally shown in FIG. 5, are each formed into a pair of sections 20g as a result of a slot 20h formed in each arm. As will hereinafter appear, the arms 20f of the stopper 20 must exhibit some resiliency or flexibility, and it has been found advantageous to provide the slot 20h so as to provide the smaller sections 20g which will have increased flexibility if formed of plastic material.

Each of the arms 20f is so shaped or formed that each section 20g thereof is provided with an outward extension 20j having tapered exterior surfaces 20k and 20l; see FIG. 4. Such extension and tapered surfaces are formed to cooper ate wit h the aforementioned helically-shaped ears or sections 19 in the cell access opening 14a of the battery cover 14. As such, even though the ears 19 are formed with a helical shape for cooperation with the aforedescribed twist or rotatable plugs, the arms 20f are caused to engage such ears as the respective stopper 20 is inserted. That is, as each stopper 20 is rectilinearly inserted into the respective cell access opening, the arms 20f, but more particularly the sections 20g, are caused to flex inwardly as the tapered surfaces 20l ride up or bear against the respective ears. When the stopper 20 is sufficiently inserted to cause the extensions 20j to pass beyond the ears 19, the tapered surfaces 20k of each arm 20f engage the respective ears 19, the resiliency of the arms causing the stopper to be drawn or urged downwardly into the cell access opening 14a. Such movement causes the resilient washer 22 to be compressed against the peripheral edge 14b. The sealing washer 22 is held firmly in such position by the stopper 20 so that the respective cell is continuously sealed.

Referring to FIG. 8 of the drawings, there is shown therein a second embodiment 24 of the instant invention. Such embodiment 24 comprises substantially the same upper and lower molded sections 18a and 18b of the battery closure means 18 heretofore described with respect to the first embodiment. However, the second embodiment 24 differs from the first embodiment in that the second embodiment 24 has stoppers 26, each of which is formed with depending arms 26 wherein the knee or extension 26b between the tapered exterior surfaces 26c and 26d follows a line 26e (see FIGS. 9 and 11) which conforms to or follows the lower most edge 28a of the ears 28 which are formed in the access opening 30 in the cover of the battery as shown in FIG. 10 of the drawings. Such lower most edge 28a is shown most particularly in FIG. 12 and the angle of disposition of the extension 26b of plug 26 is shown most particularly in FIG. 11.

As shown most particularly in FIGS. 13 and 14 of the drawings, when the second embodiment 24 of the present invention is rectilinearly inserted into the several cell access openings 30 in the battery cover, the extension 26b of each of the sealing plugs 26 slides beyond the respective ears 28 so as to cause the tapered surface 26c to sealingly engage the lower most edge 28a of the respective ears 28. That is, what with the angular disposition of the line 26e between the tapered surfaces 26c and 26d, as represented in FIG. 11, the tapered surface 26c is formed to have a helical line which conforms to the lower most edge 28a of the respective ears 28. This enables the several segments 26f on each side of each plug 26 to sealingly mate with the corresponding one of the ears 28 as a result of rectilinearly insertion of the entire second embodiment 24 into the various cell access openings. This causes the respective angularly disposed frusto-conical surfaces 26c to cooperate with the respective ears 28 throughout the respective length thereof in urging the entire second embodiment 24 downwardly for the purpose of compressing the resilient washer 22 between the second embodiment 24 and the battery cover 14. It is thus seen that both embodiments of the subject battery closure means provides a stopper which enables a battery cell to be firmly and effectively sealed merely by rectilinear insertion of the stopper into the cell access opening of the battery cover even though such cover is adapted to receive a twist or rotary sealing plug. Further, this arrangement enables a plurality of stoppers for a single battery to be ganged together as shown in FIGS. 1, and 2 of the drawings, so that a single insertion or removal motion of the respective closure means either seals all of the battery cells or opens the same, as desired.

Although I have shown and described certain specific embodiments of my invention, I am well aware that many modifications thereof are possible. The invention, therefore, should not be restricted except insofar as is necessitated by the prior art and by the spirit of the appended claims.

I claim:

1. Battery closure means having at least two interconnected stoppers for simultaneous insertion in individual cell access openings in a battery cover wherein each such opening includes one or more ears disposed at an angle to the plane of said opening for locking engagement with a rotatable bayonet plug, comprising in combination, each of said stoppers comprising an arm engageable with said ear and having a surface a portion of which is disposed at the angle of disposition of the corresponding ear for engagement therewith upon rectilinearly simultaneous insertion of said stoppers into said openings.

2. Battery closure means according to claim 1 wherein the engagement of said stopper arm surface portion and the corresponding ear is along a line on said surface.

3. Battery closure means according to claim 2 wherein said line is disposed at an angle to the plane of the corresponding access opening in said cover.

4. Battery closure means according to claim 3 wherein said arm is formed of flexible material whereby said arm is urged toward the respective ear.

5. Battery closure means according to claim 4 wherein said surface of said arm engages an edge of said ear when the respective stopper is in engagement with said cover.

6. Battery closure means according to claim 5 wherein said line defined on said arm surface by engagement thereof with said edge of the corresponding ear is arcuate and extends substantially the length of said edge on said ear.

* * * * *